(12) United States Patent
Kish

(10) Patent No.: US 10,419,044 B2
(45) Date of Patent: *Sep. 17, 2019

(54) CLOSED-LOOP AUTOMATIC CHANNEL SELECTION

(71) Applicant: ARRIS Enterprises LLC, Suwanee, GA (US)

(72) Inventor: William S. Kish, Saratoga, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/723,141

(22) Filed: Oct. 2, 2017

(65) Prior Publication Data
US 2018/0091178 A1    Mar. 29, 2018

Related U.S. Application Data

(63) Continuation of application No. 14/177,634, filed on Feb. 11, 2014, now Pat. No. 9,780,813, which is a continuation of application No. 11/841,619, filed on Aug. 20, 2007, now Pat. No. 8,670,725.

(60) Provisional application No. 60/822,917, filed on Aug. 18, 2006.

(51) Int. Cl.
*H04B 17/00* (2015.01)
*H04B 1/04* (2006.01)
*H04B 17/309* (2015.01)

(52) U.S. Cl.
CPC ...... *H04B 1/0475* (2013.01); *H04B 17/0085* (2013.01); *H04B 17/309* (2015.01)

(58) Field of Classification Search
CPC ...... H04W 16/28; H04W 24/02; H04W 24/08
USPC ....... 455/509, 512, 513, 514, 515, 516, 517, 455/63.1, 63.4, 67.11, 67.16, 67.14, 69
See application file for complete search history.

(56) References Cited

U.S. PATENT DOCUMENTS

| | | | | |
|---|---|---|---|---|
| 5,991,622 A | * | 11/1999 | Henry, Jr. ............ | H04B 17/327 455/161.2 |
| 6,487,416 B1 | * | 11/2002 | Bundy ................. | H01Q 1/1257 342/374 |
| 2004/0048593 A1 | * | 3/2004 | Sano .................... | H01Q 3/2605 455/323 |
| 2004/0082356 A1 | * | 4/2004 | Walton .................. | H04B 7/022 455/522 |
| 2006/0072502 A1 | * | 4/2006 | Crandall ............... | H04W 72/02 370/329 |
| 2006/0239369 A1 | * | 10/2006 | Lee ............................ | H04L 1/20 375/260 |
| 2006/0258304 A1 | * | 11/2006 | Moon .................. | H04B 7/0811 455/101 |
| 2006/0292988 A1 | * | 12/2006 | Yuen ..................... | H04L 1/0026 455/62 |

(Continued)

*Primary Examiner* — Ping Y Hsieh
(74) *Attorney, Agent, or Firm* — Stewart M. Wiener

(57) ABSTRACT

A system and method for improving radio performance through automatic channel selection utilizing a closed-channel model is disclosed. A measurement engine records maximum user throughput on a per station basis during normal traffic operation. The measurement engine further records throughput metrics based on test traffic sent to all associated stations during idle operation. A policy logic engine utilizes the measurements to determine an optimal transmission channel for transmission and receipt of data.

20 Claims, 5 Drawing Sheets

(56) References Cited

U.S. PATENT DOCUMENTS

2008/0008110 A1* 1/2008 Kishigami ............ H04W 16/28
 370/310
2008/0192683 A1* 8/2008 Han .................... H04B 7/0417
 370/329

* cited by examiner

CLOSED-LOOP AUTOMATIC CHANNEL SELECTION

CROSS-REFERENCE TO RELATED APPLICATIONS

The present application is a continuation of U.S. patent application Ser. No. 14/177,634, filed Feb. 11, 2014, which is a continuation of U.S. patent application Ser. No. 11/841,619, filed Aug. 20, 2007, now U.S. Pat. No. 8,670,725, issued Mar. 11, 2014, which claims the priority benefit of U.S. Provisional Application 60/822,917, filed Aug. 18, 2006, the disclosures of which are incorporated herein by reference.

The present application is related to U.S. patent application Ser. No. 11/180,329 filed Jul. 12, 2005, now U.S. Pat. No. 7,899,497, U.S. patent application Ser. No. 11/010,076 filed Dec. 9,2007, now U.S. Pat. No. 7,292,198, U.S. patent application Ser. No. 11/041,145 filed Jan. 21, 2005, now U.S. Pat. No. 7,362,280, and U.S. patent application Ser. No. 11/022,080 filed Dec. 23, 2004, now U.S. Pat. No. 7,193,562, the disclosures of which are incorporated herein by reference.

BACKGROUND OF THE INVENTION

Field of the Invention

The present invention relates to wireless communication networks, specifically to reducing interference in a wireless communication network through channel selection.

Description of the Related Art

In communications systems, there is an ever-increasing demand for higher data throughput. There is a corresponding drive to reduce interference that can disrupt such communications systems.

The Institute of Electrical & Electronic Engineers (IEEE) 802.11b and 802.11g wireless local area network (WLAN) specifications divide the 2.4 gigahertz (GHz) spectrum into 14 overlapping, staggered channels. The center frequency for each of these channels is five megahertz (MHz) apart. The 802.11b and 802.11g standards further specify a spectral mask width to power level for each channel. For example, the spectral mask for 802.11b requires that the signal be attenuated by at least 30 dB from its peak energy at +11 MHz from the center frequency. As a result, an 802.11b compliant transceiver occupies five channels to an energy level of 30 dB down from the peak or center of the signal. In the United States—per Federal Communications Commission (FCC) mandate—the valid channels are one through eleven meaning that the number of non-overlapped channels is limited to channels 1, 6, and 11.

In an 802.11 compliant wireless communication network, an access point such as a base station acts as a bridge between a WLAN and a wired local area network (LAN). The access point communicates data with one or more remote receiving nodes over a wireless link in the WLAN. Due to the limited number of non-overlapped channels, the wireless link may be susceptible to interference from other access points and radio transmitting devices. The interference may force communication at a lower data rate or completely disrupt the wireless link all together.

Further, the radio spectrum is subject to arbitrary interference, which may vary from channel-to-channel. For example, the 802.11b and 802.11g standards both utilize the aforementioned 2.4 GHz band. As a result, interference may be generated from the likes of microwave ovens, cordless telephones, and Bluetooth devices. Certain components in a radio communication system (e.g., a digital subsystem) may also produce local noise. This arbitrary interference may pose a problem in that many radio communication system components have frequency-dependent performance characteristics.

To address the issue of interference in a WLAN, many access points include automatic channel selection capabilities. Automatic channel selection involves an access point attempting to identify a channel free or substantially free from interference from amongst available wireless channels. The access points then 'jumps' from channel-to-channel to avoid interfering conditions. In a wireless environment with a number of access points (e.g., a mesh network), an access point senses the presence of other access points and attempts to adjust to a quieter channel when interference from the other access points is detected.

Most automatic channel selection algorithms operate on an open-loop model. In an open-loop model, interference is evaluated only at the victimized access point while interactions between the interfering access point and the victimized receiver are ignored. Open-loop evaluation generally consists of a 'receive only' mathematical analysis technique based on a probability of packet collision in time and frequency. Open-loop selection algorithms do not consider differential environmental conditions that exist between an access point and each receiver and further fail to consider different transmit power levels. Open-loop channel selection algorithms also fail to consider frequency-specific noise local to the clients.

Implementation-specific problems also exist with respect to sampling frequency in current open-loop automatic channel selection algorithms. For example, automatic channel selection may occur only at startup. A particular instance of interference may not exist during startup of a particular communication system and, instead, arise during a communication session. In this instance, an open-loop automatic-channel selection algorithm would fail to invoke an appropriate channel adjustment.

Interference, noise, and component frequency response are asymmetric and differentially affect radio transmitters and receivers. As such, optimizing radio system performance requires selecting an optimal channel that takes all of these effects into account. There is a need in the art for an automatic-channel selection solution that takes into account these effects at any time during a communication session.

SUMMARY OF THE PRESENTLY CLAIMED INVENTION

In an exemplary embodiment of the presently claimed invention, a method for optimizing radio performance in a network is provided. Through this method, actual maximum user throughput between a measuring station and another station in the network is measured. The measurement is associated with channel quality of a present transmission channel. The method also includes test traffic data being sent from the measuring station to the other station. The measurement of this test traffic data is associated with channel quality of an available transmission channel. The measured data as it pertains to actual maximum user throughput and the test traffic data is then stored for subsequent analysis. As a result of that analysis, a determination is made with respect to channel quality between the measuring station and the other station in the network. The measuring station maintains the present transmission channel if the channel quality is the same as or greater than the channel quality of the available channel between the measuring station and the other station. If the transmission quality is less than that of another channel, the access point makes a change to that transmission channel with respect to future data exchanges.

A further embodiment of the presently claimed invention provides for a computer-readable storage medium. A program is embodied on the medium and is executable by a processor. Execution of the program by the processor allows for the performance of a method for optimizing radio performance in a network. Through this method, actual maximum user throughput between a measuring station and another station in the network is measured. The measurement is associated with channel quality of a present transmission channel. The measurement occurs during normal network traffic patterns. The method also includes test traffic data being sent from the measuring station to the other station. The measurement of this test traffic data is associated with channel quality of an available transmission channel. The measurement occurs during idle periods. The measured data as it pertains to actual maximum user throughput and the test traffic data is then stored for subsequent analysis. As a result of that analysis, a determination is made with respect to channel quality between the measuring station and the other station in the network. The measuring station maintains the present transmission channel if the channel quality is the same as or greater than the channel quality of the available channel between the measuring station and the other station. If the transmission quality is less than that of another channel, the access point makes a change to that transmission channel with respect to future data exchanges. In the event of a transmission channel change, a dynamic frequency selection mechanism is utilized.

A still further embodiment of the presently claimed invention provides for a system for optimizing radio performance. The system includes a measurement engine configured to record maximum user throughput on a per station basis during normal traffic operation. The measurement engine is further configured to record throughput metrics based on test traffic sent to all associated stations during idle operation. The system also includes a performance database configured to record and preserve per-channel throughput data. The data may be preserved across channel changes and chip resets. The system also includes a logic and policy engine configured to determine when to measure throughput, the logic and policy engine further configured to determine which channel on which throughput is measured.

DETAILED DESCRIPTION

Embodiments of the present invention provide for selection of a transmission channel so that interference may be minimized in a wireless link to a remote receiving node. The presently described system (as may be embodied in, for example, an access point) may select a transmission channel that minimizes interference from other radio transmitting devices or disturbances in the wireless link between the system and the remote receiving device. The system may further select a corresponding antenna configuration to allow for maximum gain between the system and the remote receiving device. Alternatively, the system may select a transmission channel and/or antenna configuration corresponding to less than maximum gain but providing for reduced interference in the wireless link.

The elements identified throughout are exemplary and may include various alternatives, equivalents, or derivations thereof. Various combinations of hardware, software, and computer-executable instructions may be utilized. Program modules and engines may include routines, programs, objects, components, and data structures that effectuate the performance of particular tasks when executed by a processor, which may be general purpose or application specific. Computer-executable instructions and associated data structures stored in a computer-readable storage medium represent examples of programming means for executing the steps of the methods and/or implementing particular system configurations disclosed herein.

Figure 1:
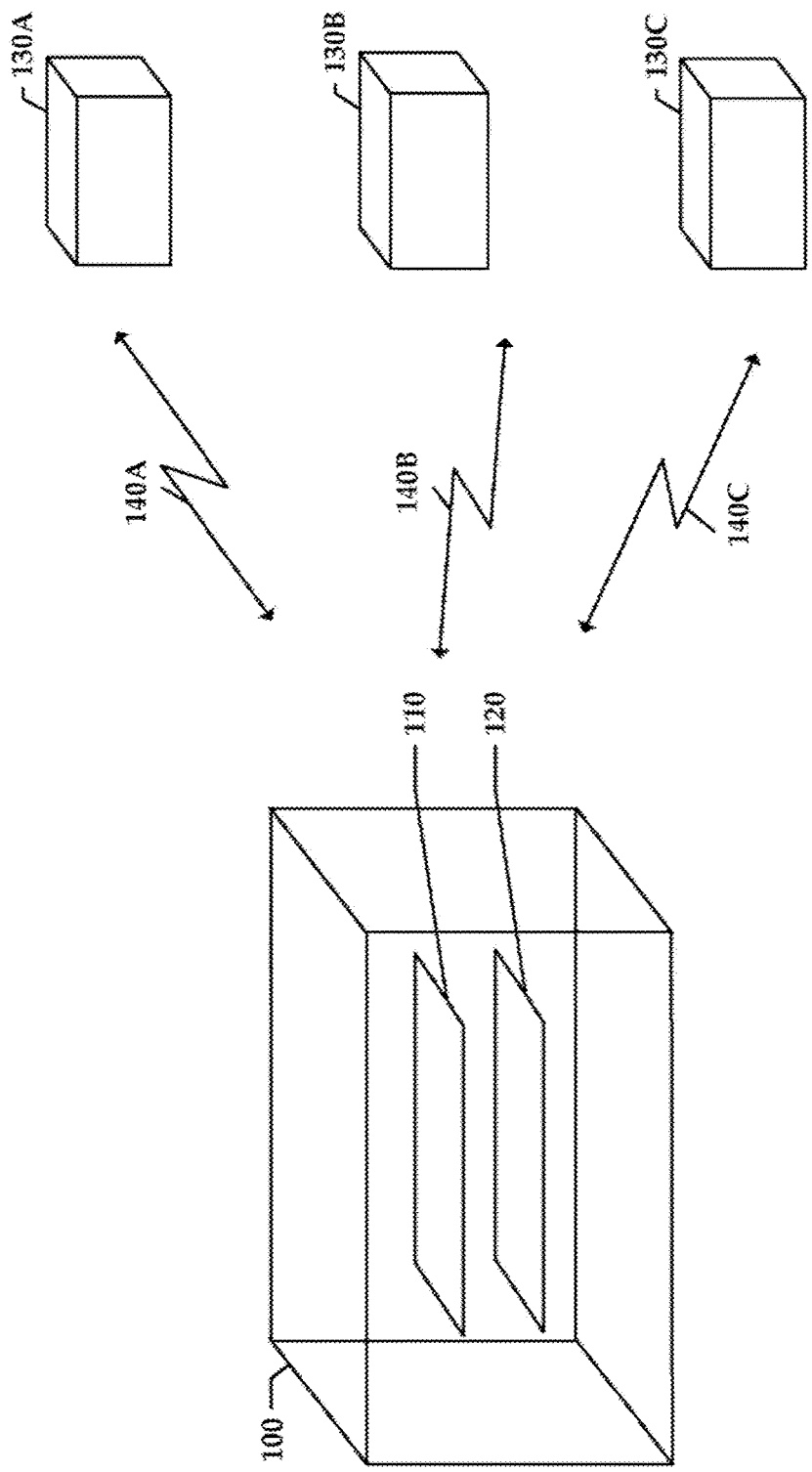
FIG. 1 illustrates a system including an antenna apparatus with selectable elements.

FIG. 1 illustrates a transmitter and/or receiver system 100 including an antenna apparatus with selectable elements. For ease of reference, transmitter and/or receiver system 100 will hereinafter be referred to as transceiver system 100. The transceiver system 100 illustrated in FIG. 1 may be representative of an 802.11 access point, an 802.11 receiver, a set-top box, a laptop computer, an Internet Protocol television (IPTV), a Personal Computer Memory Card International Association (PCMCIA) card, or a remote computing terminal such as a handheld gaming device. Transceiver system 100 may communicate with one or more remote receiving nodes over a wireless link, for example, in an 802.11 wireless network. The transceiver system 100 may receive data from a router connected to the Internet (not shown). The transceiver system 100 may transmit the data to one or more remote receiving nodes (e.g., receiving nodes 130A-130C). Transceiver system 100 may also form a part of a WLAN by enabling communications among two or more of the remote receiving nodes 130A-130C (e.g., as an intermediate node or proxy). Although the transceiver system 100 of FIG. 1 is described as the access point for an 802.11 wireless network, transceiver system 100 may also include the remote receiving node 130A.

Transceiver system 100 as referenced in FIG. 1 includes a communication device 120 and an antenna apparatus 110. Communication device 120 is inclusive of any device for converting data at a physical data rate and for generating and/or receiving a corresponding radio frequency (RF) signal. Communication device 120 may include a radio modulator/demodulator for converting data received by the transceiver system 100 (e.g., data received from a router) into the RF signal for transmission to one or more of the remote receiving nodes 130A-130C. The communication device 120 may include circuitry for receiving data packets from the router and circuitry for converting the data packets into 802.11 compliant RF signals.

The antenna apparatus 110 includes individually selectable antenna elements (not shown). When selected, each of the antenna elements produces a directional radiation pattern with gain as compared to an omnidirectional antenna. As further described in the context of FIG. 3, antenna apparatus 110 includes an antenna element selector device 310 to selectively couple one or more of the antenna elements to the communication device 120. Examples of antenna apparatus 110 and antenna element selector device 310 are further described in U.S. patent publication number 2006-0038734 for a "System and Method for an Omnidirectional Planar Antenna Apparatus with Selectable Elements"; U.S. patent publication number 2006-0038735 for a "System and Method for a Minimized Antenna Apparatus with Selectable Elements"; and U.S. Pat. No. 7,193,562 for a "Circuit Board Having a Peripheral Antenna Apparatus with Selectable Antenna Elements." The disclosure of each of the aforementioned applications and patent has previously been incorporated by reference.

Figure 2:
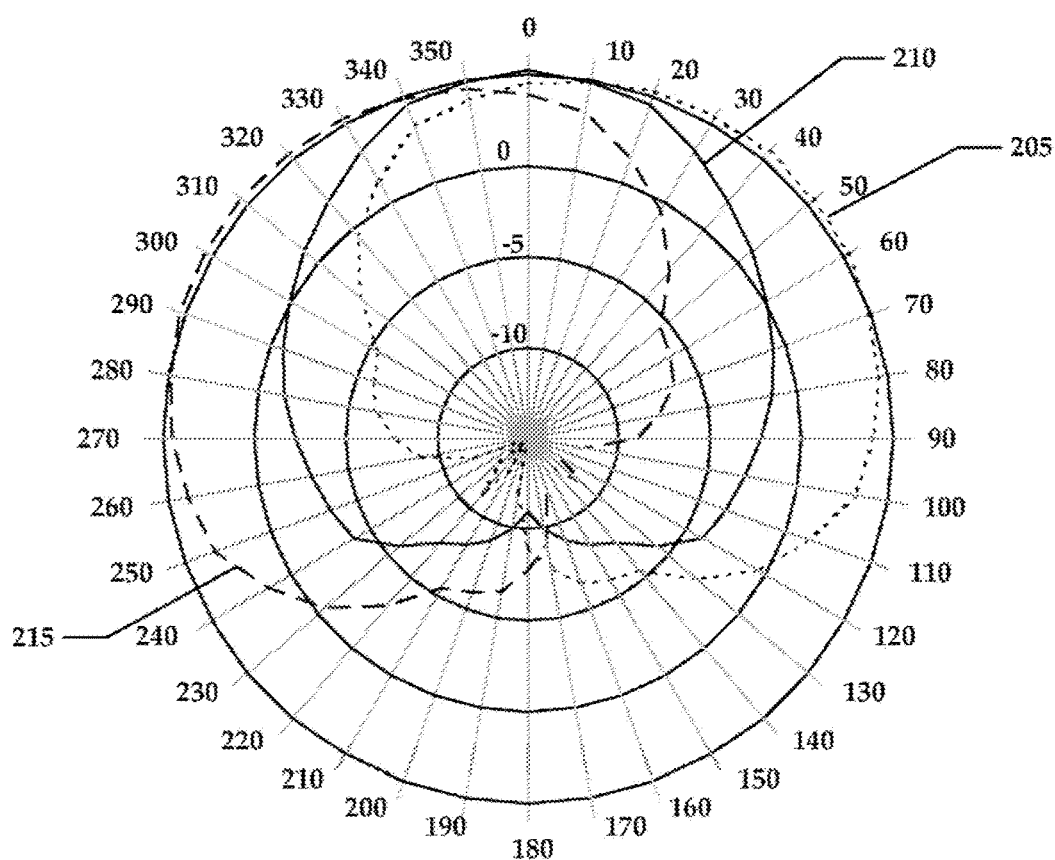
FIG. 2 illustrates various radiation patterns resulting from selecting different antenna configurations of the antenna apparatus of FIG. 1.

FIG. 2 illustrates various radiation patterns resulting from selecting different antenna elements of the antenna apparatus 110 of FIG. 1. Antenna apparatus 110 used to produce the exemplary radiation pattern of FIG. 2 includes four selectable antenna elements {A|B|C|D}. The antenna elements (referred to as antenna elements A-D) used to produce the radiation pattern of FIG. 2 are offset from each other by 90 degrees. Each antenna element produces a similar radiation pattern offset from the other radiation patterns. For example, the radiation pattern of antenna element A is offset by 90 degrees from the radiation pattern of antenna element B. Accordingly, selecting one or more of the antenna elements A-D produces 15 different radiation patterns. For clarity of discussion, only three radiation patterns are shown in FIG. 2.

A first radiation pattern 215, depicted as a dashed line, is produced by selecting the antenna element A. The radiation pattern is a generally cardioid pattern oriented with a center at about 315 degrees in azimuth. A second radiation pattern 205, depicted as a dotted line, is produced by selecting the antenna element B. The antenna element B is offset 90 degrees from antenna element A. The radiation pattern 205 is therefore oriented with a center at about 45 degrees in azimuth. A combined radiation pattern 210, depicted as a bold solid line, results from selecting the antenna element A and the antenna element B. By selecting two or more of antenna elements A-D, a substantially omnidirectional radiation pattern may be produced. Antenna apparatus 110 may produce a range of radiation patterns, ranging from highly directional to omnidirectional.

Figure 3:
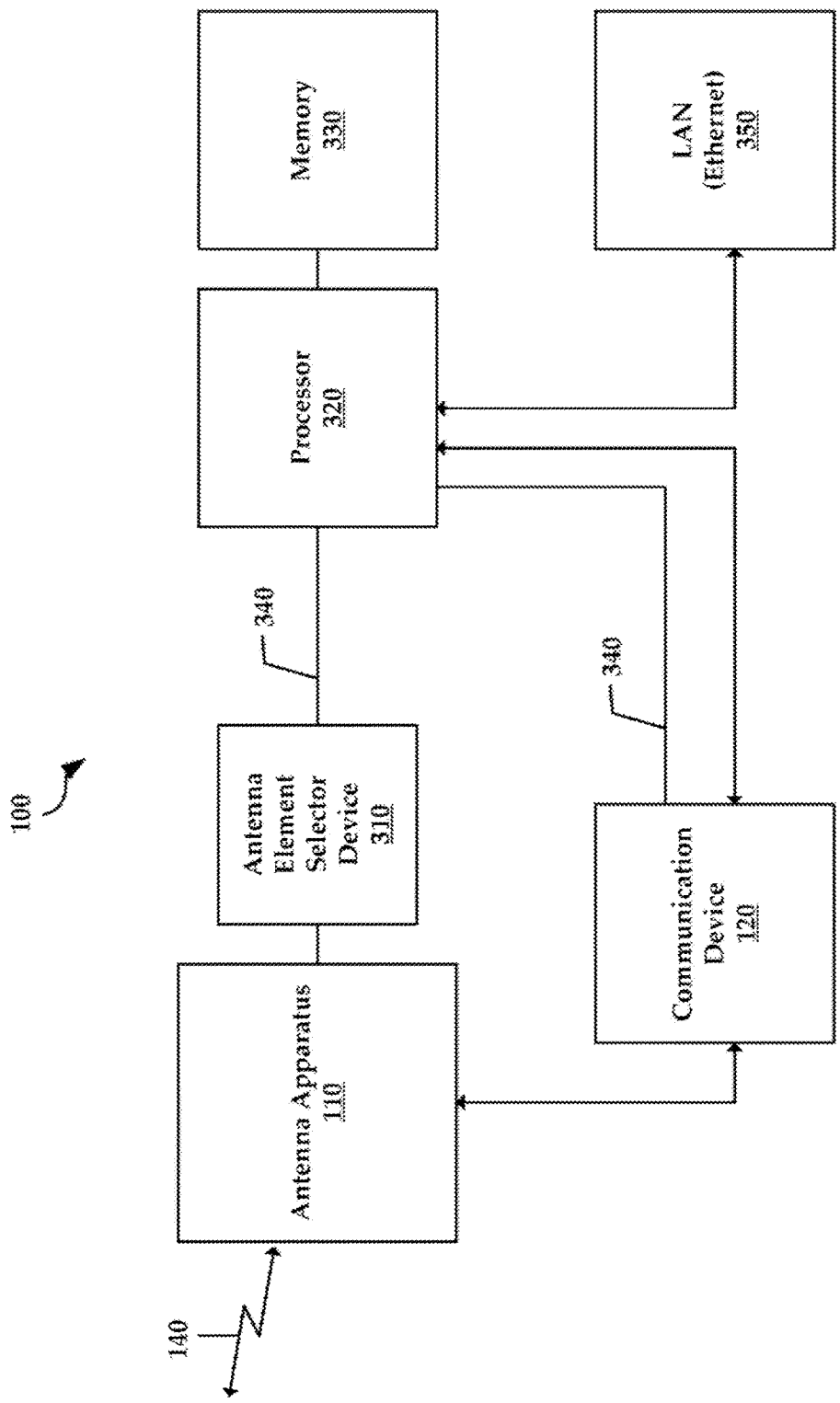
FIG. 3 illustrates an exemplary block diagram of the system of FIG. 1.

FIG. 3 illustrates an exemplary block diagram of the transceiver system 100 of FIG. 1. Transceiver system 100 as illustrated in FIG. 1 includes a processor 320 coupled to a memory 330. Processor 320 may include a microcontroller, a microprocessor, or an application-specific integrated circuit (ASIC). Processor 320 executes a program stored in the memory 330. Memory 330 may also stores transmission channel data, which may be retrieved by the processor 320 to control selection of a transmission channel. Memory 330 may store other information including data related to an optimal antenna configuration of the antenna apparatus 110 as well as information related to selection of a physical data rate of the communication device 120.

In FIG. 3, processor 320 is coupled to the antenna element selector device 310 by a control bus 340. The antenna element selector device 310 of FIG. 3 is coupled to the antenna apparatus 110 to allow selection from among the multiple radiation patterns described in FIG. 2. The processor 320 controls the antenna element selector device 310 to select an antenna configuration for antenna apparatus 110 and its resulting radiation pattern(s).

The processor 320 of FIG. 3 is further coupled to the communication device 120 by the control bus 340. The processor 320 controls the communication device 120 to select a physical data rate (i.e., one of the multiple physical data rates). The processor 320 controls the physical data rate at which the communication device 120 converts data bits into RF signals for transmission via the antenna apparatus 110.

In some embodiments, the processor 320 may receive packet data, Transmission Control Protocol (TCP) packet data, or User Datagram Protocol (UDP) packet data from LAN 350. The processor 320 converts the TCP or UDP packet data into an 802.11 wireless protocol. The processor 320 selects an antenna configuration of the antenna apparatus 110 and sends the 802.11 wireless protocol to the communication device 120 for conversion at the physical data rate into RF for transmission via the antenna apparatus 110 to the remote receiving node (e.g., the remote receiving node 130A) over the wireless link (e.g., the wireless link 140A).

Processor 320 also controls selection of a transmission channel for the communication device 120 with respect to minimizing interference. Embodiments of the present invention may utilize a closed-loop approach, which allows for direct measurement of a metric such as throughput. The metric is then used as the basis for transmission channel optimization decisions. A closed-loop approach may also take into account channel environmental conditions, interference, and power levels. Closed-loop channel selection schemes may transmit a pilot signal to a remote access point. The remote access point may then determine the magnitude and/or phase of the channels from each pilot signal, find optimal weight values based on the magnitude and/or phase of the channels and sends these values back to the base station. The base station may then use these weight values to adapt the transmission of data channels.

Figure 4:
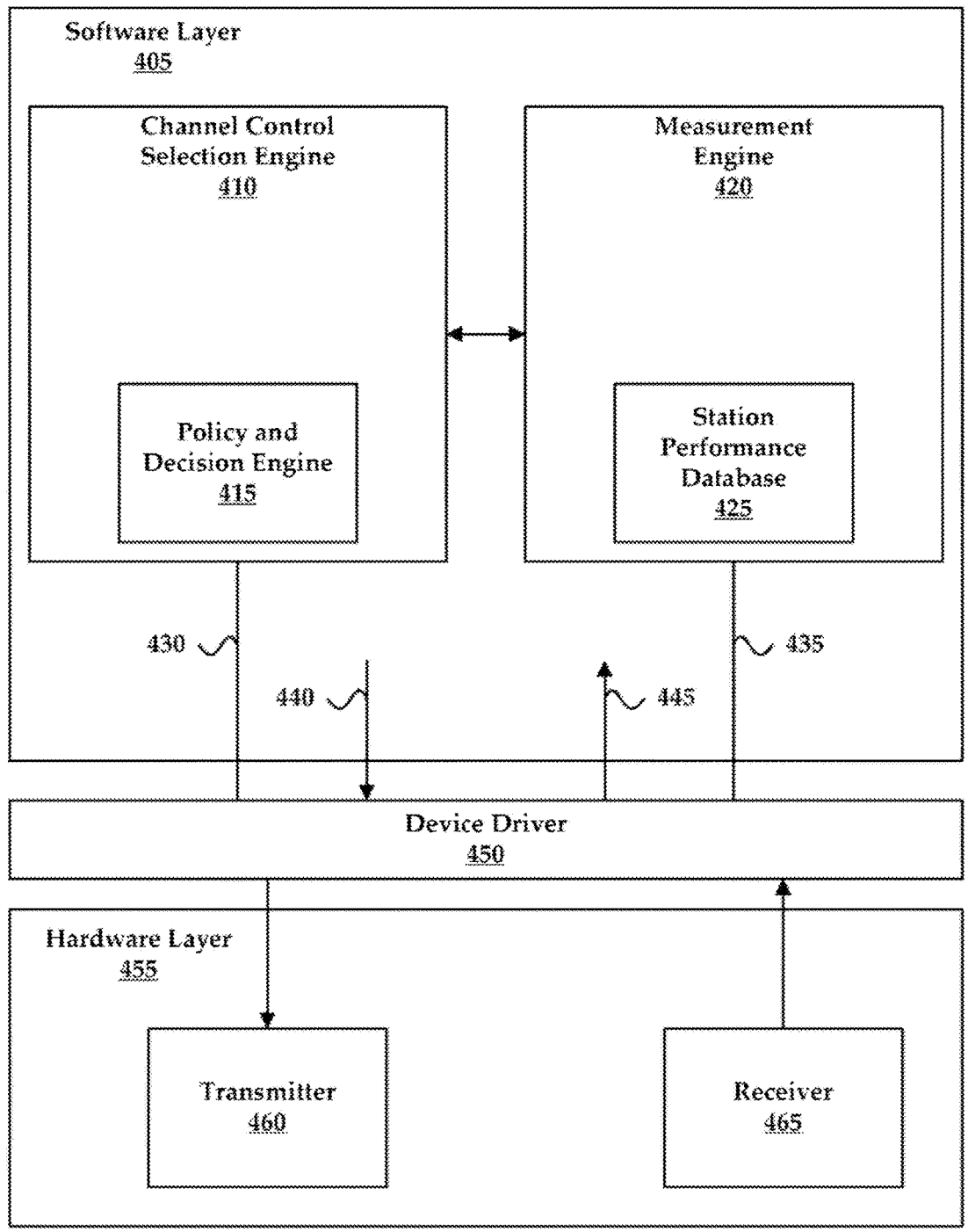
FIG. 4 illustrates a block diagram of an exemplary software layer, device driver, and a hardware layer of the system illustrated in FIGS. 1 and 3.

FIG. 4 illustrates a block diagram of an exemplary software layer 405, a device driver 450, and a hardware layer 455. The software layer 405 and the device driver 450 include instructions executed by the processor 320 of FIG. 3. The hardware layer 455 includes hardware elements of the transceiver system 100 described with respect to FIG. 3, such as the antenna selector device 310 and the communication device 120. Although described as software and hardware elements, various aspects of the present invention may be implemented in combinations of software, hardware, and firmware.

The software layer 405 includes a channel control selection engine 410 and a measurement engine 420. The channel control selection engine 410 includes a policy and decision engine 415. The policy and decision engine 415 encapsulates policy and decision making including when to measure and when to change a channel. The measurement engine 420 includes a station performance database 425. The hardware layer 455 includes a transmitter 460 and a receiver 465.

The channel control selection engine 410 is linked to the measurement engine 420. The channel control selection engine 410 communicates with the device driver 450 via link 430. The measurement engine 420 communicates with the device driver 450 via link 435. The device driver 450 receives packets via link 440 from the software layer 405 and sends the packets to the transmitter 460 in the hardware layer 455. The device driver 450 also receives packets from the receiver 465 in the hardware layer 455 and sends the packets to the software layer 405 via link 445.

The channel control selection engine 410 includes software elements configured to select a transmission channel for the device driver 450. Channel control selection engine 410 may operate in conjunction with other engines or modules. For example, an embodiment of the present invention may further include a transmission control selection engine for selecting a desirable antenna configuration to further aid in minimizing wireless network interference. This engine may be similar to that disclosed in U.S. patent publication number 2006-0040707 for a "System and Method for Transmission Parameter Control for an Antenna Apparatus with Selectable Elements," the disclosure of which has been previously incorporated herein by reference.

Selection of a particular transmission channel may be based on analysis and feedback received at measurement engine 420 or based on (or in conjunction with) decisions rendered by the policy and decision engine 415. The measurement engine 420 includes software elements configured to update transmission channel quality metrics for each transmission channel based on data initially received at the device driver 450. The measurement engine 420 is configured to maintain the transmission channel quality metrics in the station performance database 425. The station performance database 425 records and preserves per-channel throughput data across channel changes and chip resets. The database 425 may also preserve data across a system reboot.

An advantage of the transceiver system 100 is that the channel control selection engine 410 may select, for example, a transmission channel that minimizes interference for communicating over the wireless link 140A to the remote receiving node 130A based on feedback (i.e., direct or indirect) from the receiving node utilizing an aforementioned closed-channel approach. Particular antenna configuration selections for the antenna apparatus 110 may also aid in this regard.

The device driver 450 may indicate whether the remote receiving node received transmitted packets on a particular antenna configuration and transmission channel and metric quality related to the same. The transmission control selection engine 410 may also select another transmission channel for communicating over the wireless link 140B to the remote receiving node 130B based on the feedback. By selecting an optimal transmission channel and, if necessary, an optimal antenna configuration, the radiation pattern and transmission channel of the transceiver system 100 may minimize interference in the wireless link 140A and/or the wireless link 140B.

Information provided by the channel control selection engine 410 may be used to help select an appropriate antenna configuration corresponding to a maximum gain for the wireless links 140A-140C. Alternatively, information generated by the channel control selection engine 410 may be used to select the antenna configuration corresponding to less than maximal gain but corresponding to reduced interference in the wireless links 140A-140C.

Figure 5:
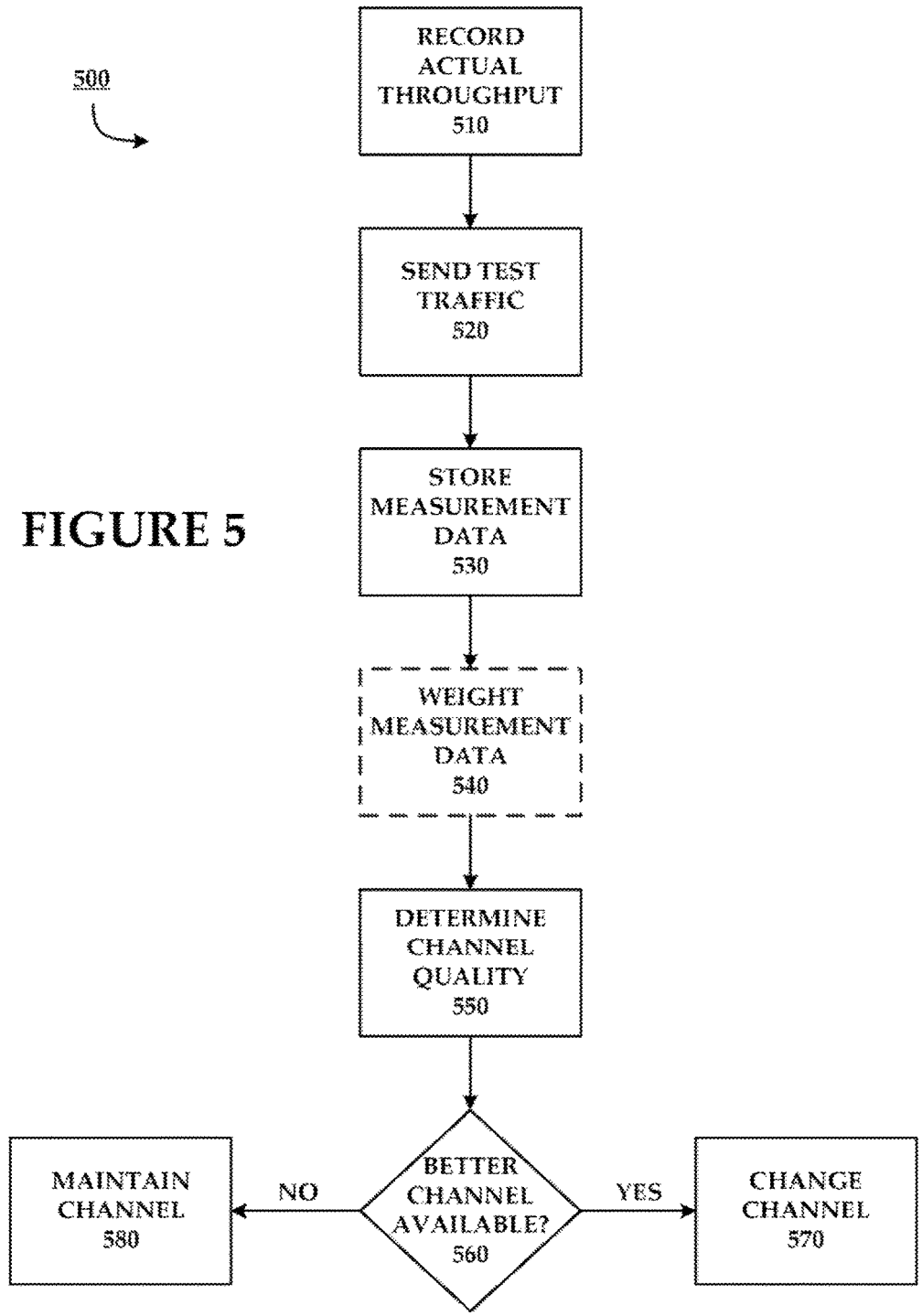
FIG. 5 illustrates an exemplary method for automatic channel selection as may be executed by the system of FIGS. 1 and 3.

FIG. 5 illustrates an exemplary method 500 for automatic channel selection. The steps identified in FIG. 5 (and the order thereof) are exemplary and may include various alternatives, equivalents, or derivations thereof including but not limited to the order of execution of the same. The steps of the process of FIG. 5 (and its various alternatives) may be embodied in hardware or software including a machine-readable storage medium (e.g., optical disc, memory card, or hard drive) including instructions executable by the processor of a computing device.

In step 510, the measurement engine 420 of transceiver system 100 records actual maximum user throughput on a per station basis. These measurements may occur during normal network traffic patterns. The measurements may be associated with a current transmission channel. In step 520, the measurement engine 420 of transceiver system 100 sends test traffic to those stations that were measured in step 510. Throughput measurements of the test traffic data taken during step 520 may occur during idle periods. Measurements taken in step 520 may utilize modeling or other throughput estimation techniques known in the art due to the presently idle nature of the particular channel. The measurement operations of step 520 pertain to other available transmission channels.

Measurements may be scheduled by the policy and decision engine 415 of transceiver system 100. For example, measurements may be taken only when wireless link utilization is below a particular threshold. That threshold may be the sum of the uplink and downlink. Measurements may also be taken where there is no traffic of a particular classification or importance (e.g., non-video or non-voice traffic) present on the network. The presence of important traffic may be determined 'in the now' (i.e., is there important traffic immediately present on the link) or following a predefined number of seconds. Measurements taken in steps 510 and 520 may be stored at step 530 in the station performance database 425 of system 100.

In optional step 540, measurement data as acquired in steps 510 and 520 may be weighted in order to assign a greater overall value to more recent data. The weighted data may be stored in performance database 425 in place of or in addition to that data initially measured in steps 510 and 520. Weightings may be applied by the measurement engine 420 with respect to identifying when the particular measurement data was acquired.

The quality of the present and other available transmission channels is determined in step 550. In order to determine the quality of channels other than the present channel, transceiver system 100 may utilize channel probing. Channel probing may further involve gratuitous channel changing in order to gather data. In this regard, measurements taken during step 520 may occur concurrently with certain measurements taken in step 510 or serially, before or after the same. Channel quality may include weighted measurement data, non-weighted measurement data, or a combination of the two.

In step 560, a determination is made by policy and decision engine 415 as to whether an available channel is better than a present channel. If the quality of one another channel is better than the present channel, then a channel change occurs in step 570. If the quality of another channel is the same or less than the present channel, then a channel change does not occur in step 580.

The quality of a channel may be determined as that channel which maximizes the sum of all throughputs to all recently measured stations. A minimum per station performance target may also be used. Advanced criteria may include assigning a differential weight to different types of clients. This may include video clients and voice clients. Channel changing as occurs in step 570 may occur through the use of an 802.11h Dynamic Frequency Selection (DFS) mechanism to quickly change channels.

While the present invention has been described with reference to exemplary embodiments, it will be understood by those skilled in the art that various changes may be made and equivalents may be substituted for elements thereof without departing from the true spirit and scope of the present invention. In addition, modifications may be made without departing from the essential teachings of the present invention. Various alternative systems may be utilized to implement the various methodologies described herein and various methods may be used to achieve certain results from the aforementioned systems.

What is claimed is:

1. A method for increasing quality of data transmission in a network having a plurality of transmission channels, the method comprising:
    determining an actual throughput of each of the plurality of transmission channels, during normal network traffic patterns;
    transmitting test data to the plurality of transmission channels, during an idle period of the network;
    measuring a test throughput of each of the plurality of transmission channels, responsive to said transmitting test data;
    determining transmission channel quality metrics for the plurality of transmission channels responsive to the actual throughputs and the test throughputs;
    determining whether an available transmission channel of the plurality of transmission channels has better channel quality metrics than the channel quality metrics of a current transmission channel of the plurality of transmission channels being used to transmit data;
    selecting the available transmission channel when the available transmission channel has a better channel quality metrics than the channel quality metrics of the current transmission channel; and
    maintaining the current transmission channel for data communication, when the available transmission channel does not have better channel quality metrics than the channel quality metrics of the current transmission channel.

2. The method of claim 1, further comprising selecting an antenna configuration corresponding to the selected transmission channel to maximize gain of the network.

3. The method of claim 1, wherein at least one of the transmission channel quality metrics is a throughput metric.

4. The method of claim 1, wherein at least one of the transmission channel quality metrics also takes into account channel environmental conditions.

5. The method of claim 1, wherein at least one of the transmission channel quality metrics also includes a power level metric.

6. The method of claim 1, wherein at least one of the transmission channel quality metrics also includes a frequency response metric.

7. The method of claim 1, wherein at least one of the transmission channel quality metrics also includes a noise metric.

8. The method of claim 1, wherein the network is a wireless local area network.

9. The method of claim 1, further comprising: recording the transmission channel quality metrics; and maintaining the recorded transmission channel quality metrics across transmission channel changes.

10. The method of claim 1, further comprising determining updated transmission channel quality metrics for the available transmission channels; and selecting the transmission channel based on the updated transmission channel quality metrics.

11. The method of claim 1, further comprising determining a magnitude and a phase of each available transmission channel by transmitting a pilot signal to a remote access point.

12. The method of claim 11, further comprising determining weight values for the available transmission channels based on the determined magnitude and phase of each available transmission channel.

13. The method of claim 12, further comprising adapting a transmission of the available transmission channels based on the weight values.

14. The method of claim 1, wherein determining the actual throughputs and measuring the test throughputs are performed when link utilization in the network is below a predetermined threshold.

15. The method of claim 1, wherein determining the actual throughputs and measuring the test throughputs are performed when there is no data traffic of a particular data classification or importance.

16. The method of claim 1, wherein determining the actual throughputs and measuring the test throughputs are performed are performed concurrently.

17. A system for increasing quality of data transmission in a network having a plurality of transmission channels, comprising:
    a processor for determining an actual throughput of each of the plurality of transmission channels, during normal network traffic patterns; and
    a communication device coupled to the processor and the antenna apparatus for transmitting test data to the plurality of transmission channels via an antenna apparatus, during an idle period of the network, wherein the processor
    measures a test throughput of each of the plurality of transmission channels, responsive to said transmitting test data;
    determines transmission channel quality metrics for the plurality of transmission channels responsive to the actual throughputs and the test throughputs;
    determines whether an available transmission channel of the plurality of transmission channels has better channel quality metrics than the channel quality metrics of a current transmission channel of the plurality of transmission channels being used to transmit data;
    selects the available transmission channel when the available transmission channel has a better channel quality metrics than the channel quality metrics of the current transmission channel; and
    maintains the current transmission channel for data communication, when the available transmission channel does not have better channel quality metrics than the channel quality metrics of the current transmission channel.

18. The system of claim 17, further comprising an antenna element selector for selecting an antenna configuration of the antenna apparatus corresponding to the selected transmission channel to maximize gain of the network.

19. The system of claim 17, wherein at least one of the transmission channel quality metrics is a throughput metric, channel environmental conditions, a power level metric, a frequency response metric, or a noise metric.

20. A system for increasing quality of data transmission in a network having a plurality of transmission channels, comprising:
    means for determining an actual throughput of each of the plurality of transmission channels, during normal network traffic patterns;
    means for transmitting test data to the plurality of transmission channels, during an idle period of the network;
    means for measuring a test throughput of each of the plurality of transmission channels, responsive to said transmitting test data;
    means for determining transmission channel quality metrics for the plurality of transmission channels responsive to the actual throughputs and the test throughputs;

means for determining whether an available transmission channel of the plurality of transmission channels has better channel quality metrics than the channel quality metrics of a current transmission channel of the plurality of transmission channels being used to transmit data;

means for selecting the available transmission channel when the available transmission channel has a better channel quality metrics than the channel quality metrics of the current transmission channel; and means for maintaining the current transmission channel for data communication, when the available transmission channel does not have better channel quality metrics than the channel quality metrics of the current transmission channel.

* * * * *